US007328336B2

(12) United States Patent
Zsohar

(10) Patent No.: US 7,328,336 B2
(45) Date of Patent: Feb. 5, 2008

(54) SYSTEM AND METHOD FOR SMALL-AREA SYSTEM DATA PROCESSING

(75) Inventor: Leslie Zsohar, Round Rock, TX (US)

(73) Assignee: nCipher Corporation Ltd, Stoneham, MA (US)

(*) Notice: Subject to any disclaimer, the term of this patent is extended or adjusted under 35 U.S.C. 154(b) by 593 days.

(21) Appl. No.: 10/180,209

(22) Filed: Jun. 26, 2002

(65) Prior Publication Data

US 2003/0018788 A1 Jan. 23, 2003

Related U.S. Application Data

(60) Provisional application No. 60/300,955, filed on Jun. 26, 2001.

(51) Int. Cl.
*H04L 9/00* (2006.01)

(52) U.S. Cl. .......................................... 713/153; 726/2

(58) Field of Classification Search ................ 713/153; 726/2

See application file for complete search history.

(56) References Cited

U.S. PATENT DOCUMENTS

| | | | | |
|---|---|---|---|---|
| 4,835,763 | A * | 5/1989 | Lau | 370/223 |
| 5,390,242 | A * | 2/1995 | Bales et al. | 379/220.01 |
| 5,532,937 | A * | 7/1996 | Graziano et al. | 709/204 |
| 5,943,339 | A * | 8/1999 | Mauger | 370/397 |
| 6,016,350 | A * | 1/2000 | Funabe et al. | 713/153 |
| 6,018,771 | A * | 1/2000 | Hayden | 709/231 |
| 6,510,464 | B1 * | 1/2003 | Grantges et al. | 709/225 |
| 6,512,824 | B1 * | 1/2003 | Hsieh et al. | 379/230 |
| 6,681,327 | B1 * | 1/2004 | Jardin | 713/153 |
| 6,684,331 | B1 * | 1/2004 | Srivastava | 713/163 |
| 6,732,139 | B1 * | 5/2004 | Dillenberger et al. | 718/102 |
| 7,039,709 | B1 * | 5/2006 | Beadle et al. | 709/227 |

* cited by examiner

*Primary Examiner*—Emmanuel L. Moise
*Assistant Examiner*—Ali S Abyaneh
(74) *Attorney, Agent, or Firm*—John A. Fortkort; Fortkort & Houston P.C.

(57) ABSTRACT

A system and method for processing server-to-client and client-to-server data communications using data processing devices (DPDs) in a small-area system, such as a local area network or smaller system. The DPDs act as proxies for the servers to which the transmissions are directed. The DPDs are connected to each other in a small-area system using interconnect devices, preferably forming a bidirectional ring network, so that received transmissions can be passed among the DPDs to the appropriate DPD. The resulting system allows the DPDs to perform processing on the incoming data communications, offloading this task from the destination servers. While the preferred embodiment is specifically drawn to DPDs that perform encryption/decryption, the disclosed system may implement any number of data processing applications on data that is being transmitted between clients and servers.

29 Claims, 9 Drawing Sheets

SYSTEM AND METHOD FOR SMALL-AREA SYSTEM DATA PROCESSING

CROSS-REFERENCE TO RELATED APPLICATIONS

The present application claims the benefit of U.S. Provisional Patent Application No. 60/300,955 that was filed on Jun. 26, 2001, and entitled, "Add-Drop Layer 3 Ethernet Ring Switch" to the maximum extent allowable by law. The benefit of 35 U.S.C. § 120 is claimed for that application to the maximum extent allowable by law.

TECHNICAL FIELD

The present application relates to the processing of data communications routed over a computer network.

DESCRIPTION OF THE RELATED ART

In the space of just a few years, the Internet—because it provides access to information and the ability to publish information in revolutionary ways—has emerged from relative obscurity to international prominence. Whereas in general an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet. For purposes of the present specification, a "wide-area network" (WAN) is a network that links at least two LANs over a wide geographical area via one or more dedicated connections. The public switched telephone network is an example of a wide-area network. A "local-area network" (LAN) is a network that takes advantage of the proximity of computers to typically offer relatively efficient, higher speed communications than wide-area networks.

An internal network based on Internet standards is referred to herein as an "Intranet." Because the Internet has become the most pervasive and successful open networking standard, basing internal networks on the same standard is very attractive economically. Corporate Intranets have become a strong driving force in the marketplace of network products and services.

The present application is directed primarily toward the connection of an Intranet to the Internet and the connection of intranets to other intranets, and any network connection where security is an issue.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet. Firewalls are intended to shield data and resources from the potential ravages of computer network intruders. In essence, a firewall functions as a mechanism which monitors and controls the flow of data between two networks. All communications, e.g., data packets, which flow between the networks in either direction must pass through the firewall; otherwise, security is circumvented. The firewall selectively permits the communications to pass from one network to the other; to provide bidirectional security.

Firewalls have typically relied on some combination of two techniques affording network protection: packet filtering and proxy services.

Packet filtering is the action a firewall takes to selectively control the flow of data to and from a network. Packet filters allow or block packets, usually while routing them from one network to another (often from the Internet to an internal network, and vice versa). To accomplish packet filtering, a network administrator establishes a set of rules that specify what types of packets (e.g., those to or from a particular IP address or port) are to be allowed to pass and what types are to be blocked. Packet filtering may occur in a router, in a bridge, or on an individual host computer.

The other principal methodology used in present-day firewalls is proxies. In order to describe prior-art proxy-based firewalls, some further definitions are required. A "node" is an entity that participates in network communications. A subnetwork is a portion of a network, or a physically independent network, that may share network addresses with other portions of the network. An intermediate system is a node that is connected to more than one subnetwork and that has the role of forwarding data from one subnetwork to the other (e.g., a "router").

A proxy is an entity, running on an intermediate system, that communicates with clients on behalf of servers (e.g., Web servers, FTP servers, etc.). Clients, (e.g. computer applications which are attempting to communicate with a network) that is protected by a firewall, send requests for connections to proxy-based intermediate systems. Proxy-based intermediate systems may perform some functions for the target servers and relay information only as necessary.

Another common means for increasing security in data communication is through the use of encrypted data. In present systems, most clients and servers are capable of communicating in a secured mode in which all data which passes between the client and server is encrypted while traveling between them. In this way, any data packets which are intercepted while traveling between the client and the server are practically useless to the interceptor. When secured communications are sent between the client and the server, the recipient must first decrypt the communications before it can process the response. Secured Socket Layer (SSL) is a very common protocol for encrypted internet communications.

On the client side of this communication, the decryption is quick and unnoticeable, because it consumes a very small amount of the client system's computing power to perform the decryption. On the server side of the communication, however the problem is much more severe: because the server is often simultaneously communicating with hundreds or even thousands of client systems at a time, a significant amount of the server's capacity must be devoted to performing these decryptions.

It would be desirable to provide a system and method for performing the necessary decryption process in a separate processor from the server system, thereby offloading the decryptions from the server, while still providing secure communications over the internet.

SUMMARY OF THE INVENTION

It is therefore one object of the present invention to provide an improved computer network.

It is another object of the present invention to provide improved secure transmissions over a computer network.

It is yet another object of the invention to provide an improved system and method for providing secure communication over a computer network while offloading decryption tasks from network computer systems.

The foregoing objects are achieved as is now described. The preferred embodiment provides a system and method which allows the decryption of secure network transmissions to be processed by local service devices, on a local area network, which act as proxies for the servers to which the transmissions are directed. The service devices are connected to each other on a separate network, preferably a bi-directional ring network, so that received transmissions can be passed between them to the appropriate servers. The resulting system allows the service devices to perform necessary decryptions of the incoming traffic, offloading this task from the destination servers. While the preferred embodiment is specifically drawn to decryption processors, the disclosed system may implement any number of data processing applications on data that is being transmitted to or from the servers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative sample embodiments when read in conjunction with the accompanying drawings, wherein:

DETAILED DESCRIPTION OF THE PREFERRED EMBODIMENTS

The numerous innovative teachings of the present application will be described with particular reference to the presently preferred embodiment (by way of example, and not of limitation).

The preferred embodiment provides a system and method which allows the decryption of secure network transmissions to be processed by local service devices, on a local area network, which act as proxies for the servers to which the transmissions are directed. The service devices are connected to each other on a separate network, preferably a bi-directional ring network, so that received transmissions can be passed between them to the appropriate servers. The resulting system allows the service devices to perform necessary decryptions of the incoming traffic, offloading this task from the destination servers. While the preferred embodiment is specifically drawn to decryption processors, the disclosed system may implement any number of data processing applications on data that is being transmitted to or from the servers.

The present invention is directed to processing data communications between servers and clients. The processing of the data communications occurs in a "small-area system." A small-area system includes local area networks (LANs) and smaller systems: some examples include, without limitation, computing devices networked to form a LAN, connected printed circuit boards (PCBs), connected computing devices in a rack, connected ICs within a PCB, and a system implemented on a single chip.

As used herein, "Data Processing Device" and equivalently "DPD" will refer to local service devices, in accordance with several embodiments of the present invention, as defined by the appended claims. In the preferred embodiment, multiple DPDs, included in a data processing system, are connected between client systems and server systems. Optionally, a firewall may also be present, and the data processing system can be on the server-side of the firewall. Each of the DPDs is configured to act as a proxy for one or more server systems, and each DPD is connected to send and receive data from multiple client systems, and to send and receive data from server systems. These connections are, in the preferred embodiment, a typical packet-switched network, such as a TCP/IP network.

In addition, each DPD is connected to at least one other DPD, in a dual-ring network. Ring networks, which are known to those of skill in the art, allow data to be passed from device to device over a "daisy-chain" connection between all devices. The data processing system, in its fully functional state, interconnects the DPDs by a network of two counter-rotating rings.

Figure 1:
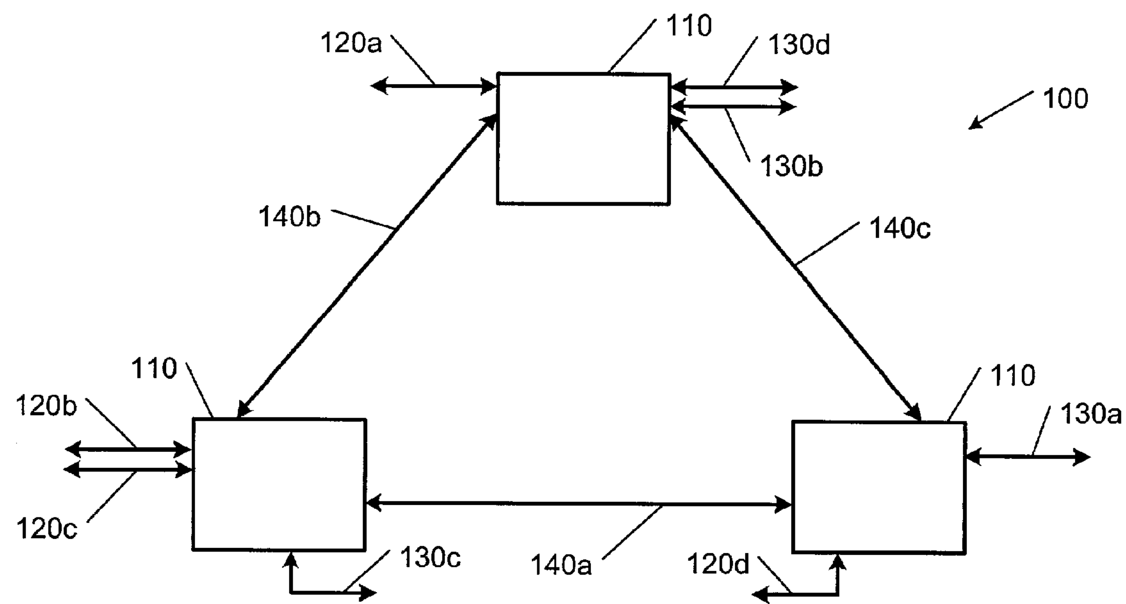
FIG. 1 depicts a block diagram of local service data processing devices connected in accordance with a preferred embodiment of the present invention and a block diagram of an alternative embodiment.
Figure 1:
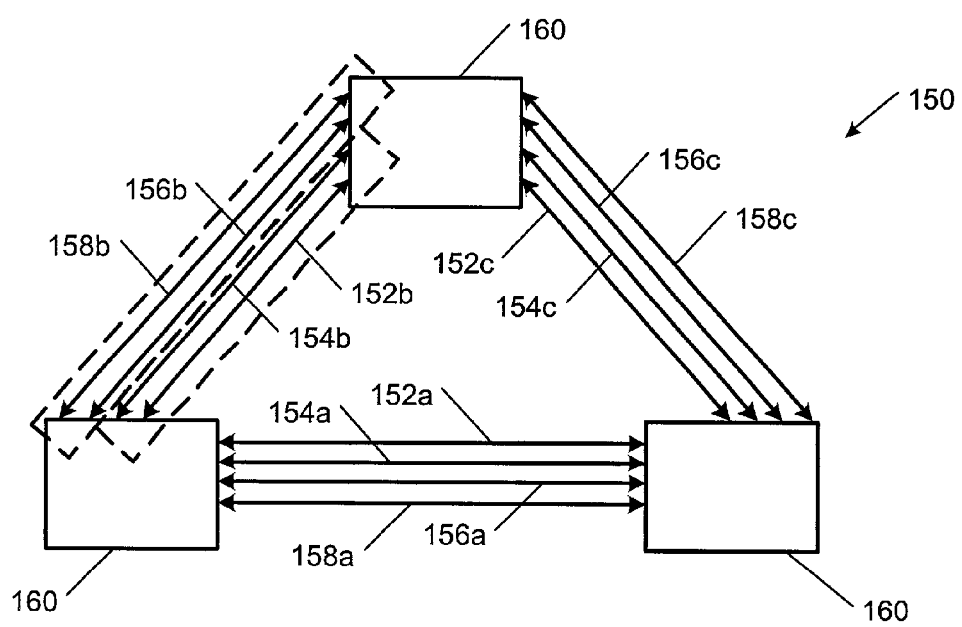

FIG. 1 shows a block diagram of multiple interconnected DPDs. Each DPD 110 in data processing system 100 includes client network connections 120 and server network connections 130. Each client network connection may comprise many client connections, and each server network connection may comprise many server connections. While FIG. 1 shows each DPD 110 as interchangeable with the other DPDs 110, each DPD 110 is a distinct component of the data processing system 100. Likewise, each client connection within 120 and server connection within 130 is distinct. Client connections 120 and server connections 130 form client-server connections (also referred to herein as "established connections"). In FIG. 1, five established network connections are illustrated: **120*a*-130*a*, 120*b*-130*b*, 120*c*-130*c*, 120*d*-130*d*, and 120*e*-130*e*. The communication pairs within 120 and 130 illustrate out-bound communications. As discussed below, in many embodiments, each DPD 110 is dynamically assigned to send communications to a specified client and/or server. Handling of incoming communications differs from handling of outgoing communications. Incoming data communications may arrive at any of the DPDs 110 and will be routed via interconnect 140 (including network connections 140***a*, 140*b*, and 140*c*) to the DPD 110 responsible for processing data communications for that established connection. Also, as discussed below, for each established connection, a DPD 110 will be assigned to perform processing on the data communications of that established connection. Further, each DPD 110 is connected to other DPDs by interconnect 140. Interconnect 140 allows each DPD 110 to communicate with at least one adjacent DPD. For example, if there were four DPDs 110, each would communicate, in this example, with the two adjacent DPDs 110, but not directly with the facing non-adjacent DPD 110. This is for illustration only; other embodiments within the scope of the claimed invention allow other communication flows between DPDs 110.

Figure 2:
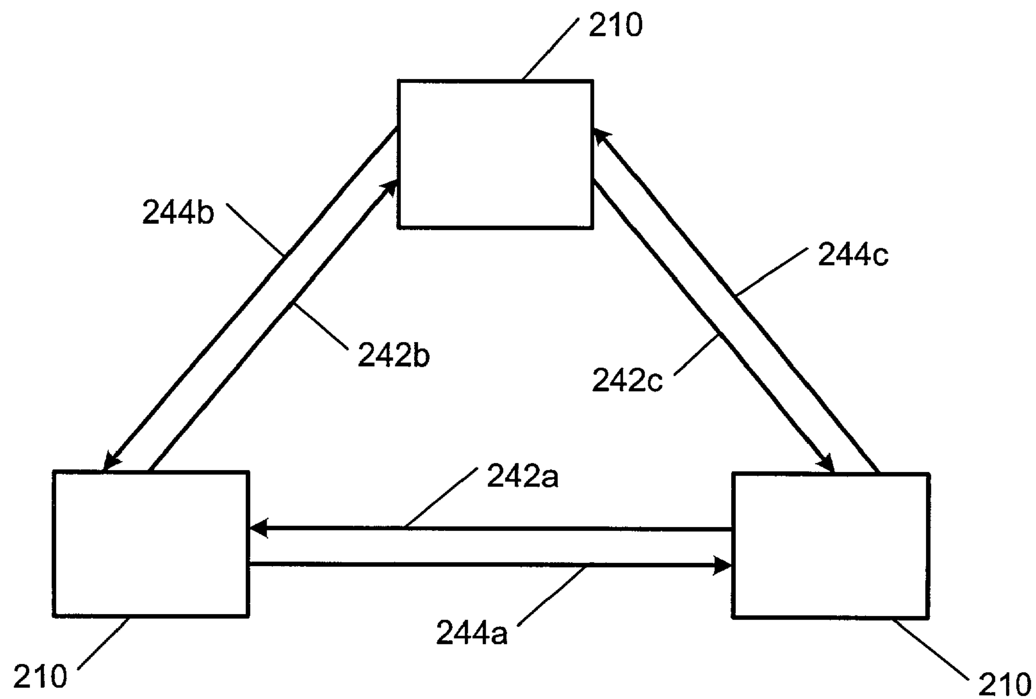
FIG. 2 shows a block diagram of local service data processing devices connected in a ring network in accordance with a preferred embodiment of the present invention.

The protection ring concept for interconnect, including fully utilized counter-rotating rings, is shown in FIG. 2. When the system is fully operational, both rotating rings can carry data between DPDs 210. Rings 242 (including connections 242*a*, 242*b*, and 242*c*) and 244 (including connections 244*a*, 244*b*, and 244*c*) together correspond to interconnect 140 shown in FIG. 1.

The interconnection, in the preferred embodiment, is accomplished through an Ethernet network connection. The interconnect is in the form of a ring, which includes a primary data ring and a protection ring. In some embodiments, the primary data ring and the protection ring are counter-rotating.

In the preferred embodiment, the interconnect operates at the aggregate speed of the data processing system. For example, if a given implementation includes 10 DPDs in the data processing system, with any one of which being able to handle a gigabit of the total bandwidth, the interconnect will operate at 10 Gigabit Ethernet. This aggregate speed is to ensure that if all DPDs are receiving data, as described more fully below, and passing to other DPDs, there is no data bottleneck in the interconnect. Note that there is no restriction to the concept if the interconnection is an aggregate of smaller speed connections.

The interconnect may be an aggregate of communication means as shown in FIG. 1. For example, data processing system 150 illustrates a ring network interconnect that includes multiple rings functioning in aggregate as an interconnect. Data processing system 150 also illustrates use of separate interconnects for client-to-server communications than for server-to-client communications. In data processing system 150, rings 152 (including connections 152*a*, 152*b*, and 152*c*) and 154 (including connections 154*a*, 154*b*, and 154*c*) serve for client-to-server communications being processed by DPDs 160, while rings 156 (including connections 156*a*, 156*b*, and 156*c*) and 158 (including connections 158*a*, 158*b*, and 158*c*) serve for server-to-client communications being processed by DPDs 160.

Also in FIG. 1, each DPD 110 is a local processing device comprising a processor, volatile and non-volatile memory, and network interface circuitry for communication with external clients, servers, and other DPDs. Each DPD is capable of performing one or more data processing functions on data passing between the clients and servers, and is capable of routing data between DPDs 110, over the interconnect 140, to be delivered to the appropriate server. This allows multiple DPDs to be connected to a server farm with any packets to any server being able to go to any of the DPDs, while ensuring that these packets will be properly delivered.

The preferred embodiment allows data centers, particularly those with large numbers of servers, to offload certain data processing functions to the DPD devices, which are closer to their public network ingress/egress points. As a result, the load on the servers is reduced, and the servers appear, to the client systems, to function much more efficiently. In the preferred embodiment, the data processing functions performed by the DPDs 110 of FIG. 1 include SSL encryption and SSL decryption functions, allowing secure transmissions between the clients and servers, without burdening the servers with SSL tasks.

Each DPD is configured to handle a set of established connections between the clients and servers. The DPD that handles a specific established connection is chosen when the TCP SYN (open) packet is received. Of course, in implementations using other network protocols, those of skill in the art will recognize that an appropriate means of allocating network traffic can be implemented in accordance with those protocols.

To handle packet routing between clients and servers, the DPDs 110 of FIG. 1 include an address-lookup mechanism that encompasses the aggregate number of connections of the interconnect network. This address lookup determines whether the packet is destined for a server serviced by this particular DPD, or whether it should be added to the interconnect network to be routed to another server. If added to the interconnect network, a small header is prepended to the data packet to indicate the destination.

In the preferred embodiment, the address lookup mechanism is accessible to special control packets and to the management port configuration. In this way, the handling DPD can signal the address lookup to other DPDs. There is a thin application layer at the network PHY level that operates at the aggregate bandwidth of the interconnect network. This thin layer performs the add-drop function to the interconnect. This thin layer will also resolve any misordering that is due to the interconnect network itself. This thin layer is also responsible for buffering any bursts that cannot be handled by the slower-speed portions of DPD.

Figure 3:
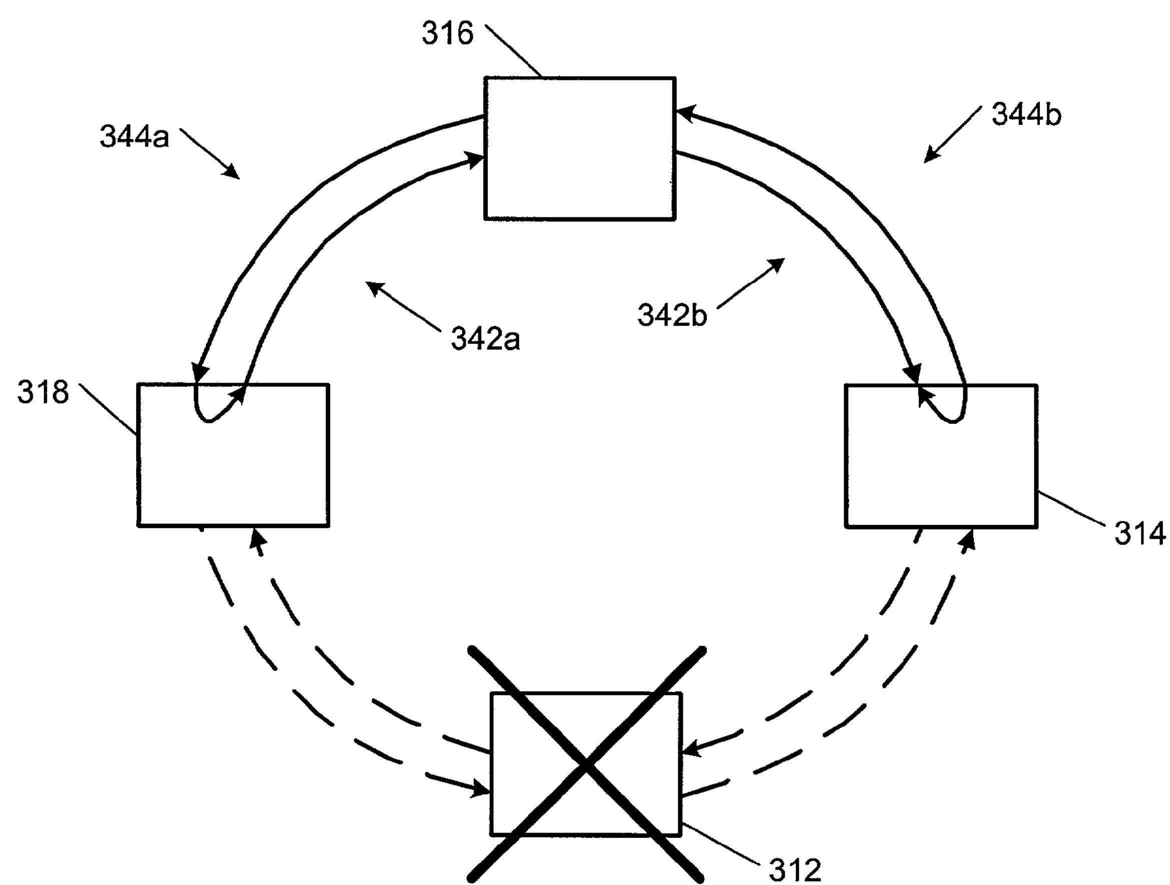
FIG. 3 depicts a block diagram of local service data processing devices connected in a ring network, with a failed device, in accordance with a preferred embodiment of the present invention.

When a DPD 312 breaks down, the system can heal itself as shown in the FIG. 3. In this case, the DPDs 314 and 318 adjacent to the disconnect can simply loop the signal back from the primary ring 342 (including connections 342*a* and 342*b*) to the secondary ring 344 (including connections 344*a* and 344*b*), thus preserving communications between all working DPDs. In this case, the working DPDs 314, 316, and 318 will take on the processing and outbound-communication responsibilities ordinarily performed by the malfunctioning DPD 312.

Figure 4:
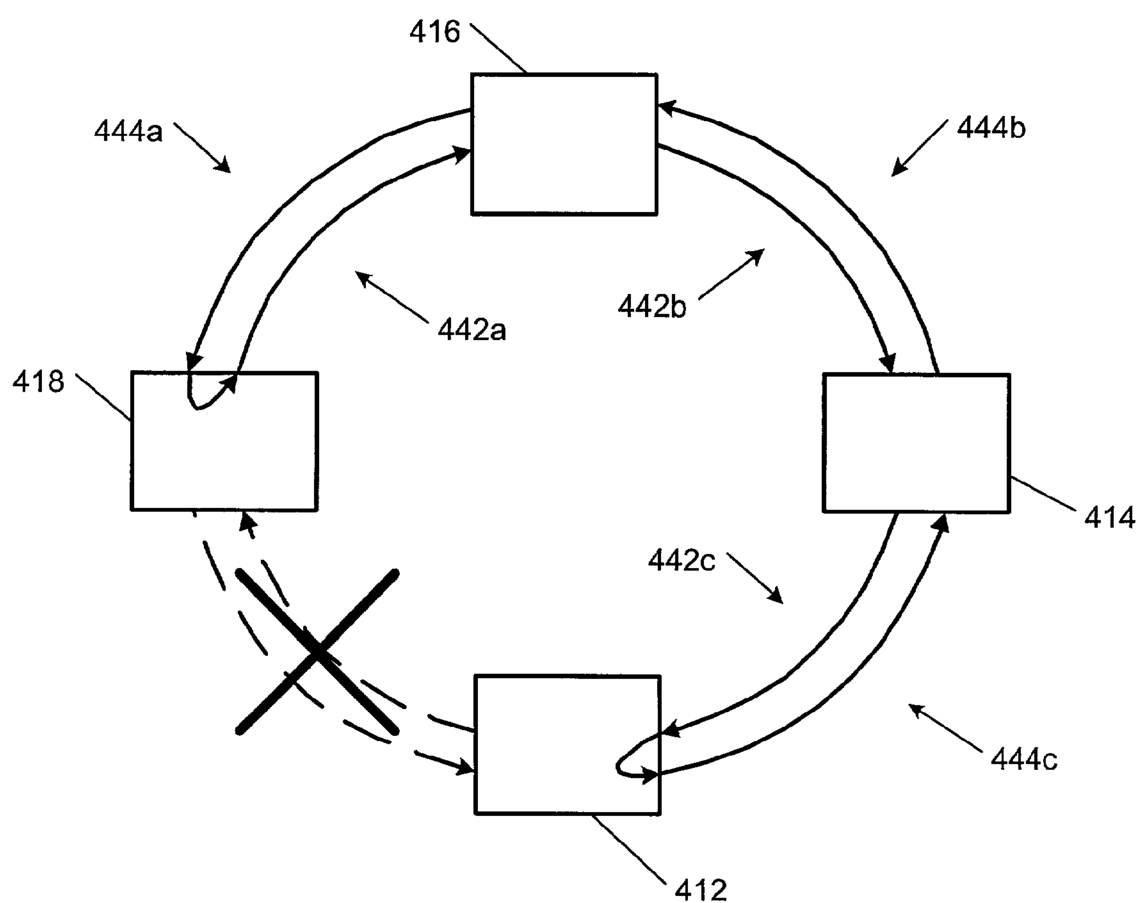
FIG. 4 shows a block diagram of local service data processing devices connected in a ring network, with a failed connection, in accordance with a preferred embodiment of the present invention.

When only an interconnect link is broken, the system can heal itself as shown in FIG. 4. Similar to the above case, the DPDs 412 and 418 on each side of the disconnect can simply loop the signal back from the primary ring 442 (including connections 442*a*, 442*b*, and 442*c*) to the secondary ring 444 (including connections 444*a*, 444*b*, and 444*c*), thus preserving communications between all functioning DPDs.

When the system heals itself, as in either of the above examples, the interconnect bandwidth is cut in half. A known protocol such as used by SONET or others can be used to detect and initiate the loopback in the event of a break. A great advantage to the self-healing mechanism described above is that any single DPD or interconnection can fail, and the remaining DPDs will still have access to all parts of the data processing system. This redundancy ensures that the failure of one DPD device or interconnect will not cripple the system altogether.

Figure 5:
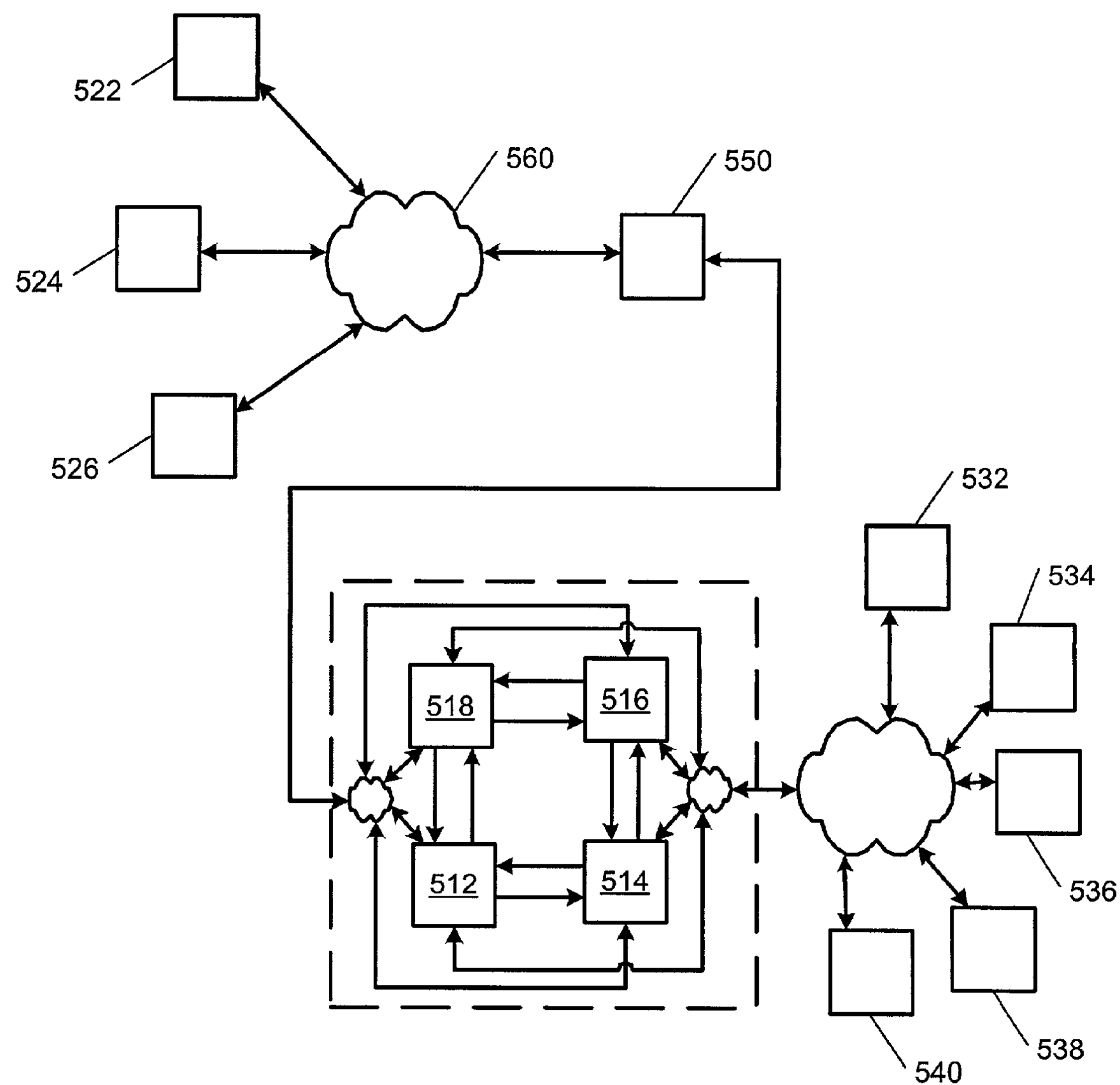
FIG. 5 depicts a block diagram of local service data processing devices connected within a client-server model in accordance with a preferred embodiment of the present invention.

FIG. 5 shows a block diagram of the system of the preferred embodiment connected within an Internet environment. In FIG. 5., client systems 522, 524, and 526 communicate with server systems 532, 534, 536, 538, and 540 over internet 560. Firewall 550 routes data traffic, in a conventional manner, between the wide-area network (WAN) internet 560 and the local area network (LAN) which includes DPDs 512, 514, 516, and 518, servers 532, 534, 536, 538, and 540, and other systems not shown.

DPDs 512, 514, 516, and 518 are connected to communicate with servers 532, 534, 536, 538, and 540, and are configured to act as proxies for these servers. Further, each DPD 512, 514, 516, and 518 is connected to communicate with each other DPD 512, 514, 516, and 518 according to the interconnect described above.

According to the preferred embodiment, each DPD is able to be responsible for any established connection between any client and any server. The responsibility for a given connection remains until the connection ceases. Note that responsibility for a different connection between the same client and server—contemporaneously or at a later time—could be assigned to the same DPD or a different DPD. For example, DPD 518 is responsible for a first connection between client 522 and server 532 while, at the same time, DPD 514 is responsible for a second connection between client 522 and server 532. As another example, DPD 518 could be responsible for a connection between client 524 and server 536, while contemporaneously being responsible for a connection between client 516 and server 536. As a third example, DPD 514 could be responsible for an established connection between client 522 and server 536, while contemporaneously being responsible for an established connection between client 526 and server 538.

Communications between a client and server, in a system according to the preferred embodiment, therefore can occur as in the following example. Client 522 sends a TCP SYN addressed to server 532, over internet 560. The data passes over internet 560 and is delivered to firewall 550. Firewall 550 performs a network address translation, and routes the data to server 532.

Further, in this example, DPD 512 is assigned to act as a proxy for this specific connection for server 532. Thus, DPD 512 can be said to have "assumed responsibility" or to have been "assigned responsibility" for the established connection between client 522 and server 532 being discussed in this example. DPD 512 updates its lookup table to indicate that it, and server 532, is handling this particular TCP connection with client 522, and sends a message to the other DPDs 514, 516, and 518 to update their lookup-tables accordingly. Client 522 can then initiate an SSL session on this TCP connection. Following the establishment of the SSL session where DPD 512 is acting as a proxy for server 532 with respect to client 522 on this TCP connection, client 522 can send encrypted data destined for server 532. DPD 512 will take this encrypted data and decrypt it to clear data packets. These data packets will then be sent to server 532 for processing. Server 532 is not required to decrypt the data itself.

As server 532 responds to the communications from client 522, it will send clear data packets back to DPD 512. DPD 512 will encrypt the clear data, and send it back through firewall 550 and internet 560 to client 522. In this way, all communications over the internet between client 522 and server 532 are securely encrypted, the server 532 does not have to perform decryption tasks, and decrypted data is only passed between devices on the LAN, safely behind the firewall.

During the communications described by the example above, the firewall 550 may pass encrypted data for an open session on server 532 to one of the other DPDs. In this case, assume that firewall 550 has passed data intended for this specific connection for server 532 to DPD 516. DPD 516 will consult its lookup table, and see that this data is part of a secure session which is "owned" by DPD 512. It will prepend the encrypted data with a header indicating that it is being sent to DPD 512, and pass this encrypted data over the interconnect to DPD 514. DPD 514 will simply receive the data and pass it on to DPD 512. DPD 512 will accept this encrypted data, properly order it with other encrypted data for that session, and continue operating as described above. As such, any data for any session is re-routed over the interconnect to the appropriate DPD.

Accordingly, the data processing system of the preferred embodiment includes many features and advantages over known solutions. For example, in a data processing system with multiple established connections to a server farm and a DPD on each physical network connection to the server farm, any packet destined for any of the aggregate of servers can come into any DPD. Also, the bandwidth of the data processing system is scalable to the aggregate bandwidth of the interconnect. Also, the number of established connections is scalable based on the number of DPDs and the capacity of each. Also, Ethernets configured as counter-rotating rings are used for the interconnect. Also, address lookup information is either sent through special control packets or is relayed through a management port. Also, a protocol similar to SONET link management is used to determine breaks in the ring and to adjacently self-heal the ring. Also, in the case of system unit failure, only the sessions handled by the offending module are affected (except for reduced aggregate interconnect bandwidth). Also, in the case of physical interconnect connection failure, no established connections are affected (except for reduced aggregate interconnect bandwidth).

The present invention accomplishes many functions, including functions explicitly discussed herein, obvious to those of ordinary skill in the art, and inherent. Two functions accomplished by the present invention that are not explicitly discussed above in great detail, are scalability and packet allocation.

A data processing system according to the preferred embodiment of the present invention has scalable capacity responsive to scaling the number of DPDs and the capacity of each. For example, doubling the number of DPDs, while keeping their individual capacities the same, would double the bandwidth available to the data processing system to handle established connections.

Typical data communication systems may route different data units of the same client/server connection over different network connections. Data processing systems according to the preferred embodiment of the present invention also accomplish the function of routing client/server data units for the same connection to the DPD that has assumed responsibility for that particular connection. Without this routing functionality, each DPD in the data processing system, upon receiving a packet for an established connection, would need to be updated with state information corresponding to that established connection. By assigning one DPD to handle each established connection and routing incoming packets corresponding to that established connection to the appropriate DPD, the need to share large amounts of established connection state information among DPDs is avoided.

Figure 6:
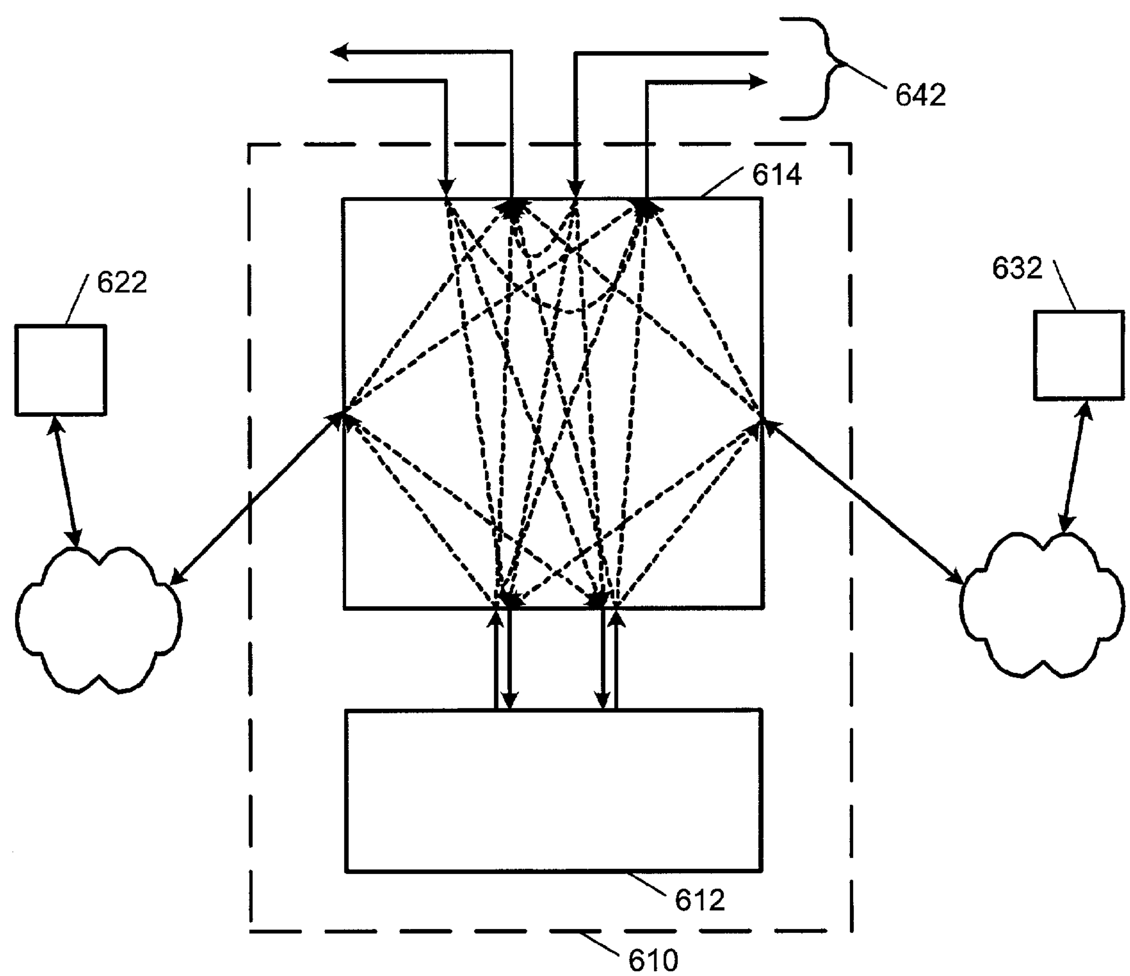
FIG. 6 illustrates cooperation of a DPD, as hereinafter defined, with an interconnect, in accordance with an embodiment of the present invention.

The cooperation of a DPD in the preferred embodiment of the present invention is illustrated in FIG. 6. Client 622 communicates with server 632. In this example, system unit 610 contains DPD 612 and interconnect device 614. Interconnect device 614 is connected to other interconnect devices via interconnect 642. In this embodiment, DPD performs encryption and decryption such that client-side communication content is encrypted, while server-side communication content is cleartext. A system unit 610 is used to show a logical association in the FIG. 6 embodiment between DPD 612 and interconnect device 614.

Embodiments of the present invention perform other data processing functions than encryption. Examples of other data processing functions include, without limitation, computing a checksum, computing a CRC, compression, decompression, and screening for specific communication elements, such as would be contemplated by an intrusion detection system.

Figure 7:
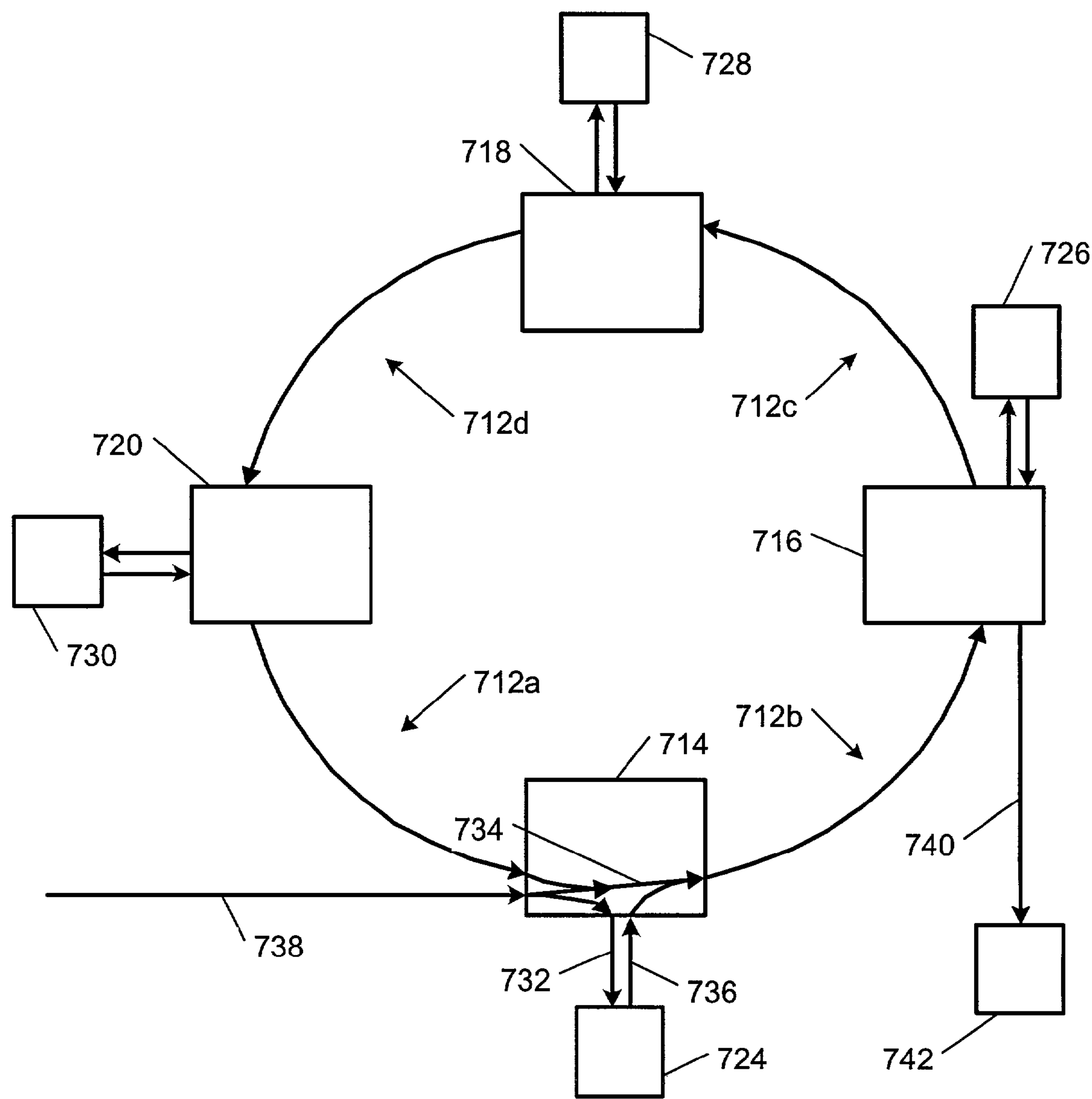
FIG. 7 shows a block diagram illustrating add-drop functionality, in accordance with an embodiment of the present invention.

Turning to FIG. 7, an embodiment of the present invention is depicted that illustrates, among other things, the add-drop functionality as present in many embodiments of the present invention. Ring 712 (including connections 712*a*, 712*b*, 712*c*, and 712*d*) serves interconnect devices 714, 716, 718, and 720. The interconnect devices 714, 716, 718, and 720 are logically associated with DPDs 724, 726, 728, and 730. Further, in this example, these communications are processed by DPD 724.

In this example, interconnect device 716 sends outgoing communications to server 742. In most embodiments, each interconnect device will send outgoing communications to one or more specific servers, so that outgoing communications will be likely to be balanced—i.e., one interconnect device will not be overloaded with outgoing communications while another's outgoing communication connection is idle.

A communication is passed to interconnect device 714. For the purposes of this example, it does not matter whether the communication comes via connection 712*a* or connection 738. If interconnect device 714 determines that DPD 724 has responsibility for the arriving communication, the communication is routed via connection 732 to DPD 724 (i.e., the communication is "dropped" from ring 712); otherwise, the communication is routed via routing option to ring connection 712*b*.

After a communication addressed to server 742 is processed, the communication is ready to be routed via connection 736 to connection 712*b;* then to connection 740. Before routing the communication via connection 736 to connection 712*b*, interconnect device 714 waits for the available bandwidth of ring 712 to accommodate the routing. When ring 712's available bandwidth accommodates, interconnect device 714 routes the communication via connection 736 to connection 712*b* (i.e.,the communication is "added"). Then the communication is routed by interconnect device 716 to server 742 via connection 740.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, the Data Processing Device, with its described functions, can be physically incorporated into a firewall device, or can be incorporated into a network interface device which is physically located in a server system. Multiple DPDs can be designed as part of one physical apparatus. The DPDs can perform other data processing tasks instead of or in addition to decryption tasks. Use of a firewall is not required to be present in all embodiments of the claimed invention, but is used to illustrate one system that is within the scope of the claimed invention.

Figure 8:
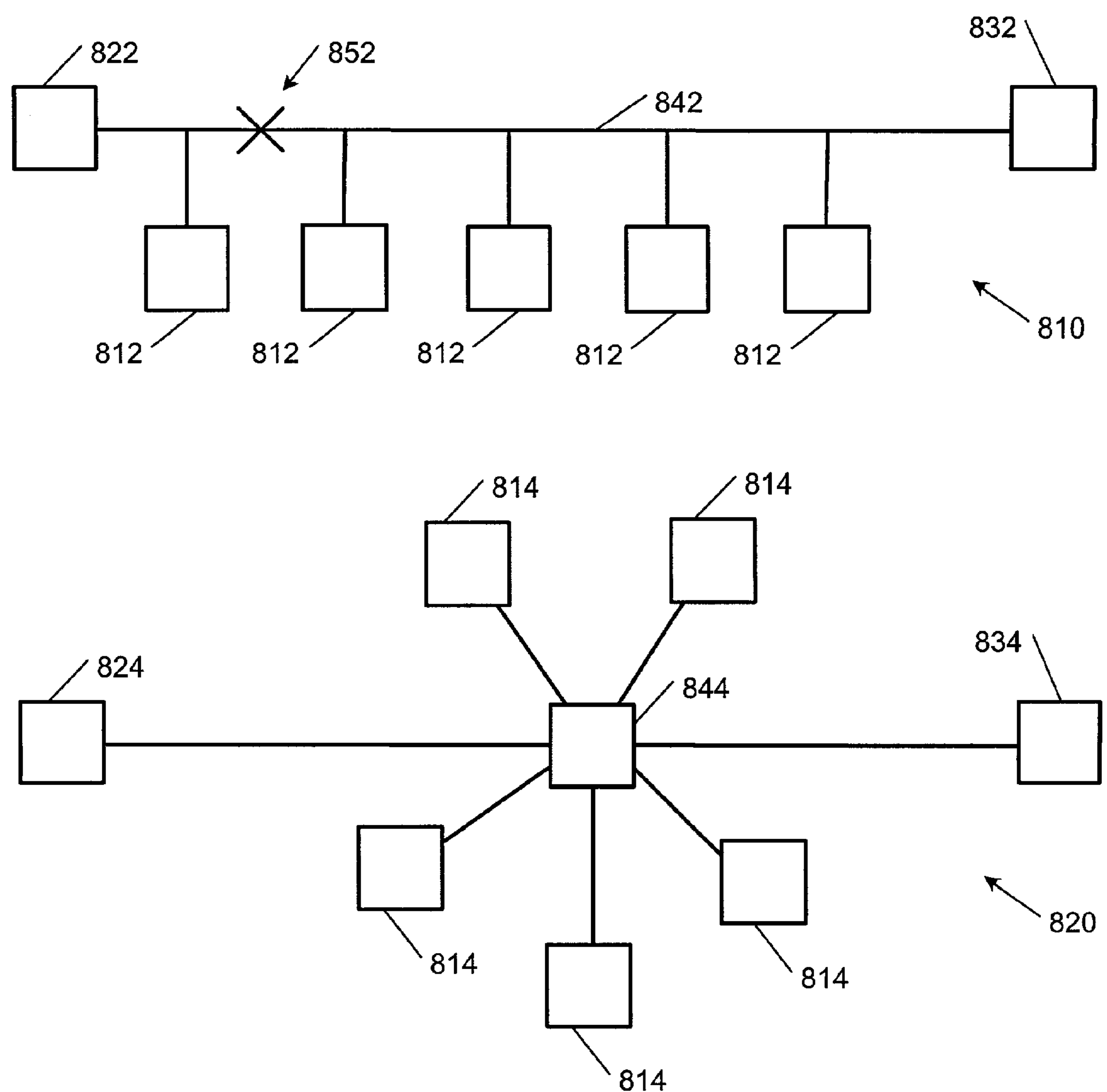
FIG. 8 shows alternative interconnects, in accordance with alternative embodiments of the present invention.

FIG. 8 shows alternative interconnects used in some embodiments of the claimed invention. Other interconnects are contemplated enabling further specific embodiments that are within the scope of the claimed invention. Bus topology interconnect 810 and star network 820 can be used as interconnects.

In the bus topology 810 specific example, interconnect 842 connects Data Processing Devices 812 to process communications between client 822 and server 832. One reason that a ring topology is used in the preferred embodiment is because a break 852 in interconnect 842 would sever communications without the self-healing attribute of the above-described ring topology.

In the star topology 820 specific example, the interconnect is formed by hub 844 connected to each DPD 814. In an implementation of this example, the interconnect device functionality for allocating communications to the proper associated DPD can be located on hub 844 to route specific communications to the appropriate DPD 814. Alternatively, communications can be broadcast to all DPDs 814, each of which would have its own interconnect device functionality residing therewith to appropriately choose between (1) discarding communications intended for a different DPD or (2) having the DPD 814 process the communication if it is the intended DPD 814 for that communication.

In a typical star topology, loss of a single hub-DPD connection would not disable the remaining DPDs, which could be configured to handle the work of the thereby disconnected DPD. But loss of hub 844 of the star interconnect would disable the interconnect's proper function without additional adaptation for self-healing.

Figure 9:
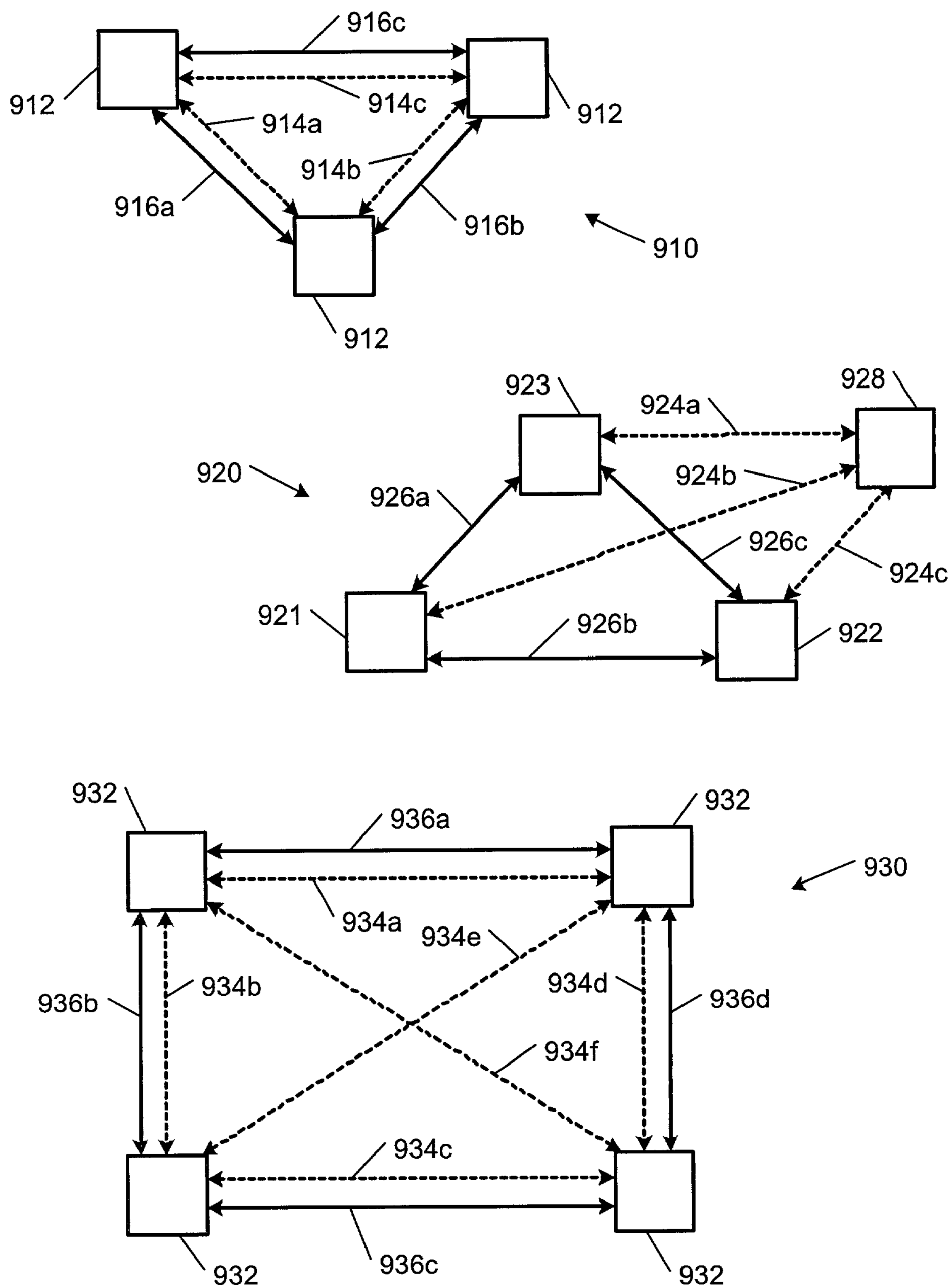
FIG. 9 illustrates a block diagram showing some alternative interconnect configurations, in accordance with potential alternative embodiments of the present invention.

FIG. 9 shows how a few data processing systems 910, 920, and 930 implement alternative interconnects within the scope of the present invention, as claimed. These alternative interconnects of data processing systems 910, 920, and 930 illustrate out-of-band routing of control communications (e.g., connection responsibility, also called "address translation") information. In-band routing of control communications simply means routing control communications via the same connections used to route data communications.

In data processing system 910, system units 912 route control communications along using interconnect 914 (including connections 914*a*, 914*b*, and 914*c*). System units 912 route data communications using interconnect 916 (including connections 916*a*, 916*b*, and 916*c*). Thus the interconnect data bandwidth of data processing system 910 is not consumed by control communications, which route in parallel to data communications. The speed of data communications does not necessarily need to be the same as the speed of control communications.

System units 921, 922, and 923 of data processing system 920 route data communications similarly to data processing system 910. To wit, data communications are routed via interconnect 926 (including connections 926*a*, 926*b*, and 926*c*). But control communications are routed via interconnect 924 (including connections 924*a*, 924*b*, and 924*c*). Device 928 is part of interconnect 924. To illustrate one embodiment of control-communication flow within data processing system 920, consider the scenario that system unit 923 has just become responsible for a given communication. Thus, the other system units (i.e., system units 921 and 922) need to be informed of that responsibility. The control communication would first be routed from system unit 923 to device 928 via connection 924*a*. Then the control communication would be routed from device 928 to system units 921 and 922, respectively via connections 924*b* and 924*c*.

The topology of data processing system 930 allows control communication to be shared among system units 932 via interconnect 934 (including connections 934*a*, 934*b*, 934*c*, 934*d*, 934*e*, and 934*f*) and data communication to be shared via interconnect 936 (including connections 936*a*, 936*b*, 936*c*, and 936*d*). For example, one of the system units 932 would inform the other system units 932 of a new established connection responsibility by sending control communication directly to each of them.

It is obvious from descriptions herein of various embodiments that interconnects may be implemented using various technologies. For example, the preferred embodiment is implemented using Ethernet, a non-time-division-multiplexing (non-TDM) and non-token-passing technology. One effect of being a non-TDM and non-token-passing technology is that the potential can exist for starvation. To solve this issue in the present invention, the bandwidth of the interconnect is required to be greater than or equal to the total bandwidth incoming to the interconnect.

Another alternative implementation of the present invention, as claimed, is on a printed circuit board (PCB). It is contemplated that the interconnect on this PCB embodiment would be best implemented using a multi-bit bus rather than Ethernet technology. Note that the PCB bus implementations would also encounter the issues associated with being a non-TDM and non-token-passing technology.

While the invention has been particularly shown and described with reference to a preferred embodiment, it will be understood by those skilled in the art that various changes in form and detail may be made therein without departing from the spirit and scope of the invention.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words “means for” are followed by a participle.

What is claimed is:

1. A data processing system in a small-area system comprising:

a client-side port configured to communicate with at least one client;

a server-side port configured to communicate with at least one server;

at least two system units;

wherein the client-side port is configured to communicate with at least one of the system units;

wherein the server-side port is configured to communicate with at least one of the system units;

wherein each system unit is configured to assume responsibility for an established connection between a server and a client;

wherein each system unit is configured to inform at least one other system unit of the assumed responsibility;

wherein each system unit is configured to, upon receiving a communication for an established connection for which the system unit has not assumed responsibility, route the communication to at least one other system unit;

wherein each system unit is configured to, upon receiving a client-to-server communication for an established connection for which the system unit has assumed responsibility, perform a first process on the communication and route the first-processed communication to the server via the server-side port; and wherein each system unit is configured to, upon receiving a server-to-client communication for an established connection for which the system unit has assumed responsibility, perform a second process on the communication and route the second-processed communication to the client via the client-side port.

2. The data processing system according to claim 1, wherein the established connection comprises an encrypted connection;

wherein the first process comprises decryption;

wherein the second process comprises encryption;

wherein the first-processed communication comprises decrypted communication; and wherein the second-processed communication comprises encrypted communication.

3. The data processing system according to claim 2, wherein the encrypted connection is an SSL connection.

4. The data processing system according to claim 1, wherein each system unit comprises:

an interconnect device;

a data processing device (DPD);

wherein the client-side port is configured to communicate with at least one of the interconnect devices;

wherein the server-side port is configured to communicate with at least one of the interconnect devices;

wherein each interconnect device is configured to assume responsibility for an established connection between a server and a client;

wherein each interconnect device is configured to inform at least one other interconnect device of the assumed responsibility;

wherein each interconnect device is configured to, upon receiving a communication for an established connection for which the interconnect device has not assumed responsibility, route the communication to at least one other interconnect device;

wherein each interconnect device is configured to, upon receiving a client-to-server communication for an established connection for which the interconnect device has assumed responsibility, route the client-to-server communication to the DPD of the interconnect device’s system unit;

wherein each DPD is configured to, upon receiving a client-to-server communication, perform a first process on the client-to-server communication and route the first-processed communication to the interconnect device of the DPD’s system unit;

wherein each interconnect device is configured to, upon receiving the first-processed communication from the DPD, route the first-processed communication to the server via the server-side port;

wherein each interconnect device is configured to, upon receiving a server-to-client communication for an established connection for which the interconnect device has assumed responsibility, route the server-to-client communication to the DPD of the interconnect device’s system unit;

wherein each DPD is configured to, upon receiving a server-to-client communication, perform a second process on the communication and route the second-processed communication to the interconnect device of the DPD's system unit; and wherein each interconnect device is configured to, upon receiving the second-processed communication from the DPD, route the second-processed communication to the client via the client-side port.

5. The data processing system according to claim 4, wherein each interconnect device responsible for an established connection between a server and a client, is configured as a server-proxy.

6. The data processing system according to claim 5, wherein each interconnect device configured as a server-proxy is configured as a TCP-proxy.

7. The data processing system according to claim 4, wherein the interconnect devices communicate via a ring network.

8. The data processing system according to claim 7, wherein each interconnect device is configured to, upon assuming responsibility for an established connection, inform interconnect devices adjacent to it in the ring network of the assumed responsibility.

9. The data processing system according to claim 8, wherein each interconnect device is configured to, upon receiving communication of a different interconnect device's assumed responsibility from one but not both adjacent interconnect devices, inform the adjacent interconnect device that did not route the communication of the assumed responsibility.

10. The data processing system according to claim 7, wherein the ring network comprises:

a primary data ring;

a protection ring; and wherein the ring network is configured to be self-healing such that if communication fails between two interconnect devices, the primary data ring and the protection ring will self-heal adjacently to the communication failure.

11. The data processing system according to claim 7, wherein the ring network comprises:

a primary data ring;

a protection ring; and wherein the ring network is configured to be self-healing such that if an interconnect device fails, the primary data ring and the protection ring will self-heal adjacently to the interconnect device failure.

12. The data processing system according to claim 7, wherein the ring network comprises a non-time-division-multiplexing, non-token-passing ring network.

13. The data processing system according to claim 12, wherein the non-time-division-multiplexing, non-token-passing ring network comprises an Ethernet ring network.

14. The data processing system according to claim 13, wherein the Ethernet ring network's bandwidth is at least the sum of the client-side port's incoming bandwidth and the server-side port's incoming bandwidth.

15. The data processing system according to claim 7, wherein the ring network includes add-drop functionality.

16. The data processing system according to claim 4, wherein each interconnect device is configured to, upon assuming responsibility for an established connection, inform other interconnect devices through an in-band communication of the assumed responsibility.

17. The data processing system according to claim 4, wherein each interconnect device is configured to, upon assuming responsibility for an established connection, inform other interconnect devices through an out-of-band communication of the assumed responsibility.

18. The data processing system according to claim 4, wherein the interconnect devices communicate via a bus network.

19. The data processing system according to claim 4, wherein the interconnect devices communicate via a star network.

20. The data processing system according to claim 4, wherein the client-side port and the server-side port are the same port.

21. The data processing system according to claim 1, wherein the client-side port is configured to communicate with at least one client via the Internet.

22. The data processing system according to claim 1, wherein the server-side port is configured to communicate with at least one server via the Internet.

23. A data processing system, comprising:

a plurality of servers configured to exchange encrypted transmissions with each other over a first network; and a plurality of local service devices configured to communicate with each other over a second network which is an Ethernet ring network;

wherein said second network comprises a primary data ring and a protection ring;

wherein said second network is configured to be self-healing such that, if communication fails between two of said local service devices, the primary data ring and the protection ring will self-heal adjacently to the communication failure;

wherein said local service devices are configured to act as proxies for said plurality of servers by decrypting encrypted transmissions directed to said plurality of servers, and each local service device is further configured to, upon assuming responsibility for decrypting an encrypted transmission, inform local service devices adjacent to it in the second network of the assumed responsibility.

24. The data processing system of claim 23, wherein said second network is bidirectional.

25. The data processing system of claim 23, wherein said second network comprises a non-time-division-multiplexing, non-token-passing ring network.

26. The data processing system of claim 25, wherein the bandwidth of said second network is at least the sum of the client-side port's incoming bandwidth and the server-side port's incoming bandwidth.

27. The data processing system of claim 23, wherein the second network includes add-drop functionality.

28. A data processing system, comprising:

a plurality of data processing devices (DPDs);

a plurality of interconnect devices adapted to communicate with each other via a ring network, wherein each interconnect device is configured to, upon assuming responsibility for an established connection, inform interconnect devices adjacent to it in the ring network of the assumed responsibility, and wherein each of said plurality of interconnect devices is configured to assign responsibility to a DPD for an encrypted connection between a server and a client, and is further configured to, upon receiving a communication for an encrypted connection for which the assigned DPD is responsible, route the communication to the assigned DPD;

a client-side port configured to communicate with the interconnect device and further configured to communicate with at least one client;

a server-side port configured to communicate with the interconnect device and further configured to communicate with at least one server;

wherein each DPD is configured, upon receipt of an encrypted communication, to decrypt the communication and route the decrypted communication to the interconnect device, and wherein the interconnect device is configured to, upon receiving the decrypted communication from the DPD, to route the decrypted communication to the server via the server-side port; and wherein each DPD is configured to, upon receiving a decrypted communication, encrypt the communication and route the encrypted communication to the interconnect device, and wherein the interconnect device is configured to, upon receiving the encrypted communication from the DPD, route the encrypted communication to the client via the client-side port.

29. The data processing system according to claim 28, wherein the client-side port and the server-side port are the same port.

* * * * *